United States Patent [19]

Gaupp

[11] Patent Number: 5,610,937
[45] Date of Patent: Mar. 11, 1997

[54] REGULATION METHOD FOR A DC ARC FURNACE

[75] Inventor: Osvin Gaupp, Baden, Switzerland

[73] Assignee: ABB Management AG, Baden, Switzerland

[21] Appl. No.: 350,997

[22] Filed: Nov. 29, 1994

[30] Foreign Application Priority Data

Dec. 22, 1993 [DE] Germany .................. 43 43 899.7

[51] Int. Cl.$^6$ ................................... H05B 7/144
[52] U.S. Cl. .................. 373/108; 373/102; 373/104
[58] Field of Search .................. 373/102–108; 363/70

[56] References Cited

U.S. PATENT DOCUMENTS

| | | | |
|---|---|---|---|
| 4,683,577 | 7/1987 | Bretthauer et al. | 373/105 |
| 4,691,325 | 9/1987 | Boisdon | 373/108 |
| 4,701,932 | 10/1987 | Bretthauer et al. | 373/104 |
| 4,888,674 | 12/1989 | Weibelzahl et al. | 363/35 |
| 5,155,740 | 10/1992 | Ao et al. | |
| 5,438,588 | 8/1995 | Wanner | 373/108 |
| 5,463,653 | 10/1995 | Du Parc et al. | 373/108 |

FOREIGN PATENT DOCUMENTS 0068180  8/1986  European Pat. Off. .

OTHER PUBLICATIONS

"Blindleistungskompensation bei nicht–periodischen Stromen und Spannungen", H.D. Fischer, etzArchiv Bd. 4 (1982), pp. 127–131.

Primary Examiner—Tu B. Hoang
Attorney, Agent, or Firm—Burns, Doane, Swecker & Mathis, L.L.P.

[57] ABSTRACT

In operation, DC arc furnaces produce reactive load fluctuations which lead to undesirable flickering phenomena especially in a frequency range from 2 Hz–20 Hz. In order to reduce these flickering phenomena, comparatively fast reactive power regulation is superimposed on slow current regulation of the DC arc furnace which is controlled by rectifiers. In consequence, the use of a reactive-power compensator to compensate for reactive power fluctuations in superfluous.

12 Claims, 3 Drawing Sheets

REGULATION METHOD FOR A DC ARC FURNACE

BACKGROUND OF THE INVENTION

1. Field of the invention

The invention is based on a regulation method for a DC arc furnace.

2. Discussion of Background

Control of a DC arc furnace is known from EP 0 068 180 B1. There, independent control loops are provided in order to eliminate flickering phenomena 2, to be precise a current control loop having a converter as the actuating element and a voltage control loop having an electrode adjusting device as the actuating element, the output signal from the current regulator being added to the actual value of the DC voltage as a servo value.

Since the reactive power consumption of a mains-commutated rectifier depends on the operating point, the correction for load changes still always results in undesirable fluctuations in the reactive power, and hence the voltage, in the mains power supply. These voltage fluctuations produce fluctuating light intensities (flicker) in lighting systems, which can have a disturbing effect.

U.S. Pat. No. A-5,155,740 specifies a flicker compensation device for DC arc furnaces, in the case of which compensation device the converter is regulated only as a function of the detected current intensity of the arc furnace.

It is disadvantageous in this case that a relatively expensive power factor correction device is required. Where the electrocurrents are small, the reactive power of the furnace can become too small. With permanently installed capacitor banks, this leads to overcompensation which is frequently not accepted by mains power supply operators.

SUMMARY OF TEE INVENTION

Accordingly, one object of the invention is to develop further a regulation method for a DC arc furnace of the type mentioned initially, in such a manner that the flicker level is reduced without reducing the mean melt power.

One advantage of the invention is that it is possible to dispense with expensive power factor correctors and/or smoothing inductors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
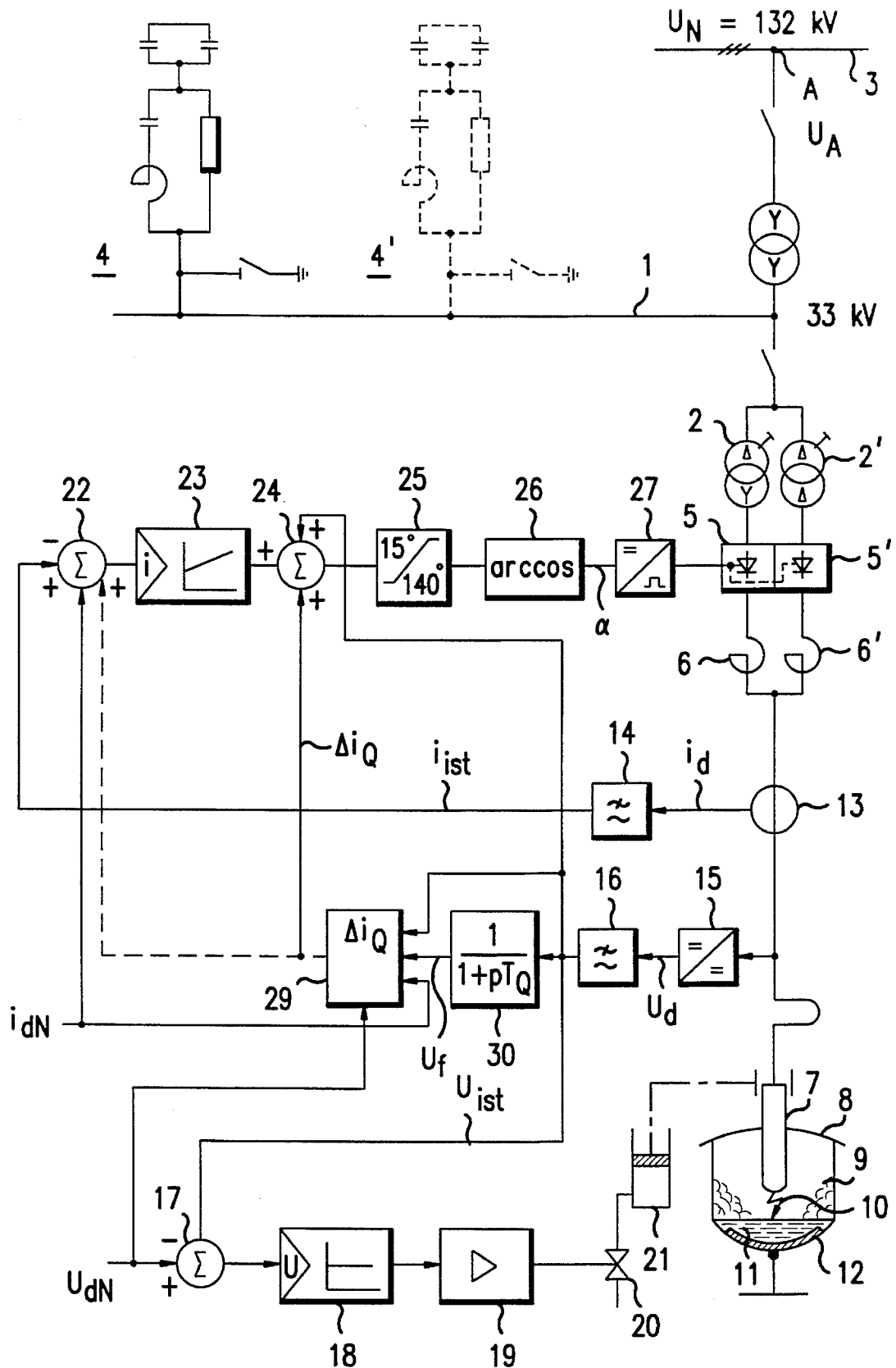
FIG. 1 shows a DC arc furnace having a current control loop, an electrode control loop and a reactive power control loop.

Referring now to the drawings, wherein like reference numerals designate identical or corresponding parts throughout the several views, FIG. 1 shows a DC arc furnace (8) having one electrode or cathode (7) which is connected to an AC mains power supply 1, at an AC voltage (1) of 33 kV, via two reactive elements or inductor coils (6, 6') which are connected in series with a plurality of switching stages in parallel paths each having one rectifier (5, 5') and one furnace transformer (2, 2'). A 2nd electrode or anode (12) which is arranged in the base region of the arc furnace (8) is connected (not illustrated) to the positive terminal of the rectifiers (5, 5'). An arc (10) burns between the lower end of the cathode (7) and a material or scrap metal (9), which is to be melted, and the surface of a melt or of a melt bath (11).

The AC mains power supply (1) is connected to filter paths (4, 4') for capacitive reactive power and, furthermore, via a high-voltage transformer and a switch at a mains power supply connection point (A), to a 3-phase high-voltage mains power supply (3) at a rated AC voltage ($U_N$) of 132 kV. The mains power supply voltage at the mains power supply connection point (A) is designated by ($U_A$).

A current transformer (13) in the power supply lead to the electrode (7) detects a direct current ($i_d$) and/or the arc current density; it is connected on the output side via a 1st low-pass filter (14) to an inverting input of a 1st adding element or adder (22). The low-pass filter (14) has a transfer function $$\ddot{U}_{14}=k_{Fi}/(1+p \cdot T_{Fi}),$$

$k_{Fi}$ being a constant, p the Laplace operator indicating a complex frequency, and $T_{Fi}$ being a filter time constant which can be predetermined and has a preferred value of 2.5 ms.

A non-inverting input of the 1st adder (22) is supplied with a required current density ($i_{dN}$) which can be predetermined or a required current level signal for the arc (10); on the output side, it is electrically connected via a current regulator (23) having a PI characteristic to a non-inverting input of a 2nd adder (24). The current regulator (23) has a transfer function $$\ddot{U}_{23}=k_i \cdot (1+p \cdot T_i)/(p \cdot T_i),$$

where $k_i$ is a constant having a preferred value of 0.2, p is the Laplace operator indicating a complex frequency, and $T_i$ is a time constant which can be predetermined and has a preferred value of 30 ms.

The 2nd adder (24) is connected on the output side via a triggering angle limiter (25), which has triggering angle limit values of, preferably, 15° electrical and 140° electrical which can be predetermined, to a downstream-connected arccos function generator (26) which, on the output side, supplies a rectifier control variable signal ($\alpha$), corresponding to a triggering angle, to a triggering pulse transformer (27) which, on the output side, controls the rectifiers (5, 5').

A voltage converter (15) which is electrically connected to the electrical supply lead of the electrode (7) detects a DC voltage or an arc voltage ($U_d$) of the DC arc furnace (8); it is connected on the output side via a 2nd low-pass filter (16) to a non-inverting input of the adder (24), furthermore to an input of a function generator (29), to an input of a 3rd low-pass filter (30) and to an inverting input of a 3rd adder (17). The 2nd low-pass filter (16) has a transfer function $$\ddot{U}_{16}=k_U/(1+p \cdot T_U),$$

where $k_U$ is a constant, p is the Laplace operator indicating a complex frequency, and $T_U$ is a filter time constant which can be predetermined and has a preferred value of 1 ms. The 3rd low-pass filter (30) has a transfer function $$Ü_{30}=k_Q/(1+p \cdot T_Q),$$

where $k_Q$ is a constant having a preferred value of 1, p is the Laplace operator indicating a complex frequency and $T_Q$ is a filter time constant which can be predetermined and has a preferred value of 1 ms.

The function generator (29) to which, furthermore, on the input side, the output signal $U_f$ of the 3rd low-pass filter (30), the signal of the required current density ($i_{dN}$) and a required DC voltage signal ($U_{dN}$) which can be predetermined are supplied, calculates a control variable ($\Delta i_Q$) of a reactive power control loop in accordance with:

$$\Delta i_Q = k_q \cdot i_{dN} \{[(1-U_f^2)/(1-U_{ist}^2/U_{dN}^2)]^{0.5}-1\}$$

where: $k_q$=a factor which can be predetermined, $U_{ist}$=filtered arc voltage of the arc furnace (8).

The control variable ($\Delta i_Q$) of the reactive power control loop is supplied to a non-inverting input of the 2nd adder (24).

Alternatively, this control variable ($\Delta i_Q$) can be supplied to a non-inverting input of the 1st adder (22), instead of to the 2nd adder (24), as is indicated by a dashed line.

A non-inverting input of the 3rd adder (17) is supplied with the required DC voltage signal ($U_{dN}$), corresponding to a required triggering angle value in the range from 15°–50° preferably in the range from 25°–35°. On the output side, the adder (17) is connected to an electrode regulator (18) which has a proportional characteristic and acts, on the output side, via a valve amplifier (19) on a valve (20) of an electrode adjusting device (21). The electrode adjusting device (21), for example a hydraulic pump having an adjusting mechanism and an electrode speed regulator, is mechanically coupled to the cathode (7) and makes it possible to adjust the height of said cathode; it acts as a 1st order delay element.

The electrode regulation operates approximately 10 times more slowly than the current regulation. The height adjustment of the cathode (7) is carried out such that the rectifiers (5, 5') operate at the mean of their drive level of, for example, 25° electrical, irrespective of the secondary voltage of the furnace transformers (2, 2') and of the required current value ($i_{dN}$) set. For simplicity, values and signals associated with them are designated in the same way.

The current regulation according to the invention has a lower-level current control loop which keeps the mean value of the current constant over a relatively long time period of 0.5 s–1 s, and has a higher-level, fast reactive power control loop which minimizes reactive power fluctuations over a time range of approximately 0.1 s. For speed reasons, this reactive power control loop has forward regulation, in the case of which the operating point of the constant reactive power is calculated on the basis of the measured furnace voltage or arc voltage ($U_d$). The calculated values are connected to the current control loop either upstream of the triggering angle limiter (25) or to the required current level ($i_{dN}$).

The regulation according to the invention acts like a rejection filter which is tuned to the frequency of 9 Hz.

Figure 2:
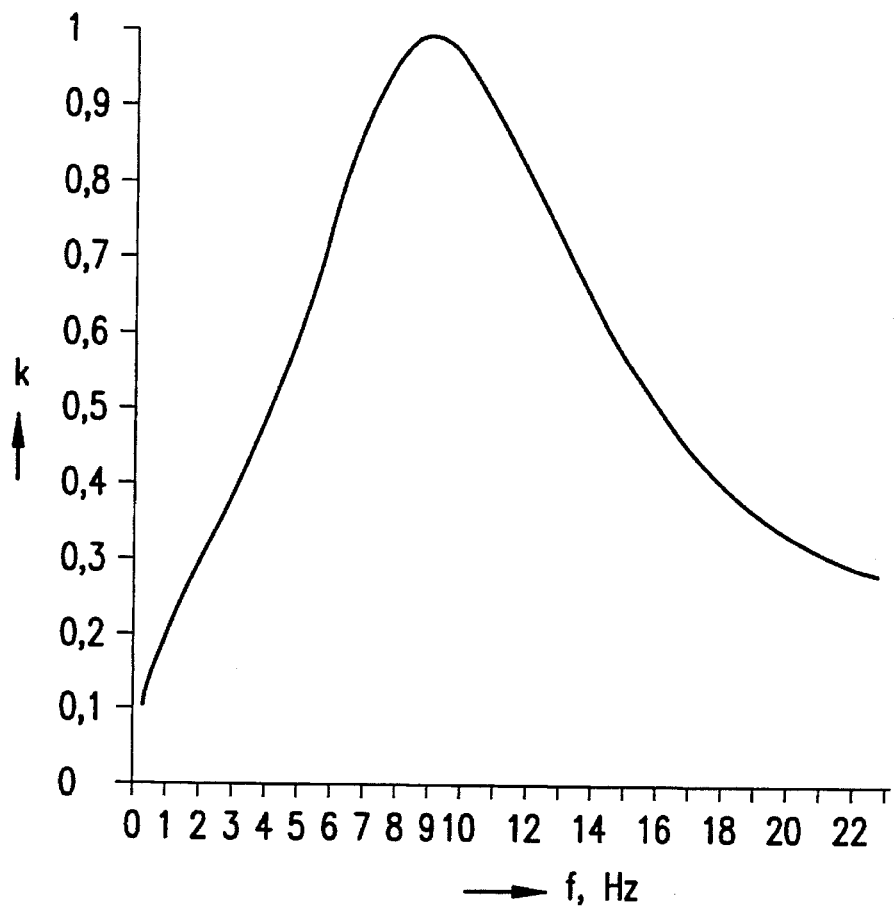
FIG. 2 shows the frequency dependency of a normalized flicker amplitude.

FIG. 2 shows an eye sensitivity curve for flicker in the high-voltage mains power supply (3), a normalized flicker amplitude (k) being shown on the ordinate and the frequency (f) in Hz on the abscissor. It can be seen that a flicker of 9 Hz is the most disturbing.

Figure 3:
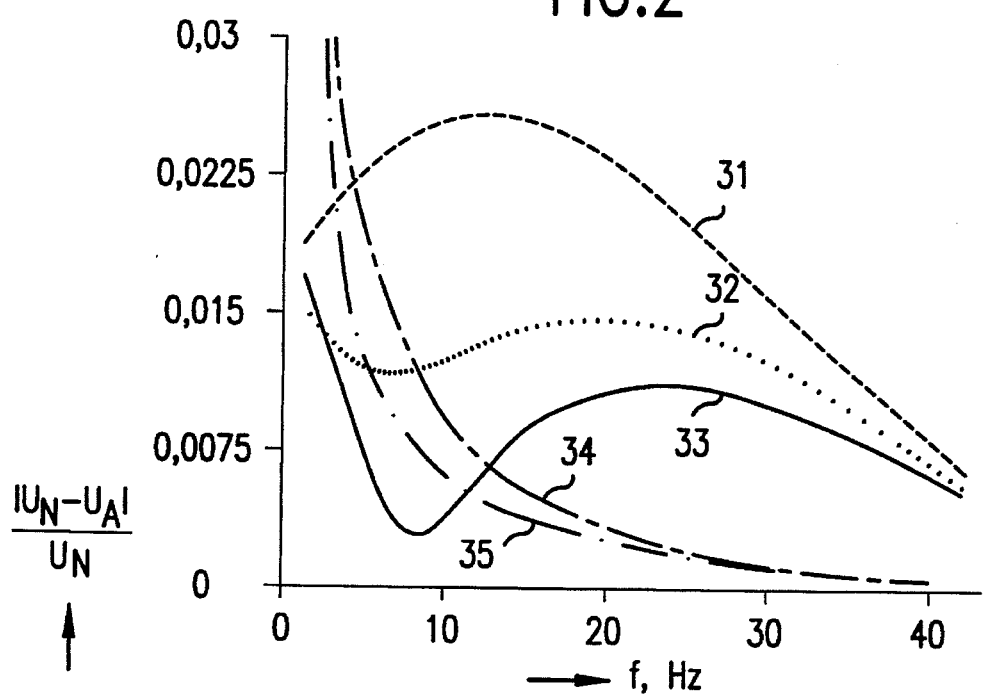
FIG. 3 shows characteristics of the interference frequency response in different operating conditions.

FIG. 3 shows disturbance frequency responses for different operating conditions, the ratio of the difference between the magnitude of the rated AC voltage ($U_N$) and the mains power supply voltage ($U_A$) at the mains power supply connection point (A) and the rated AC voltage ($U_N$) being shown on the ordinate, and the frequency in Hz being shown on the abscissor. Curve (31) shows an interference frequency response when the inductor coils (6, 6') each have an inductance of 21 μH, with current regulation only. Curve (32) applies to equal inductances, but with voltage connection, the output signal of the 2nd low-pass filter (16) being supplied to the 2nd adder (24) but not the control variable ($\Delta i_Q$) of the reactive power control loop. In the case of curve (33), according to the invention, the control variable ($\Delta i_Q$) of the reactive power control loop is additionally connected. The major filtering effect at 9 Hz can be seen here.

For comparison, the curves (34) and (35) show interference frequency responses when the inductor coils (6, 6') each have an inductance of 514 μH with current regulation only and, respectively, controlled by a rectifier control variable signal (α) of 43° electrical. In this case, a large space requirement and high costs for the inductor coils (6, 6') are disadvantageous.

Figure 4:
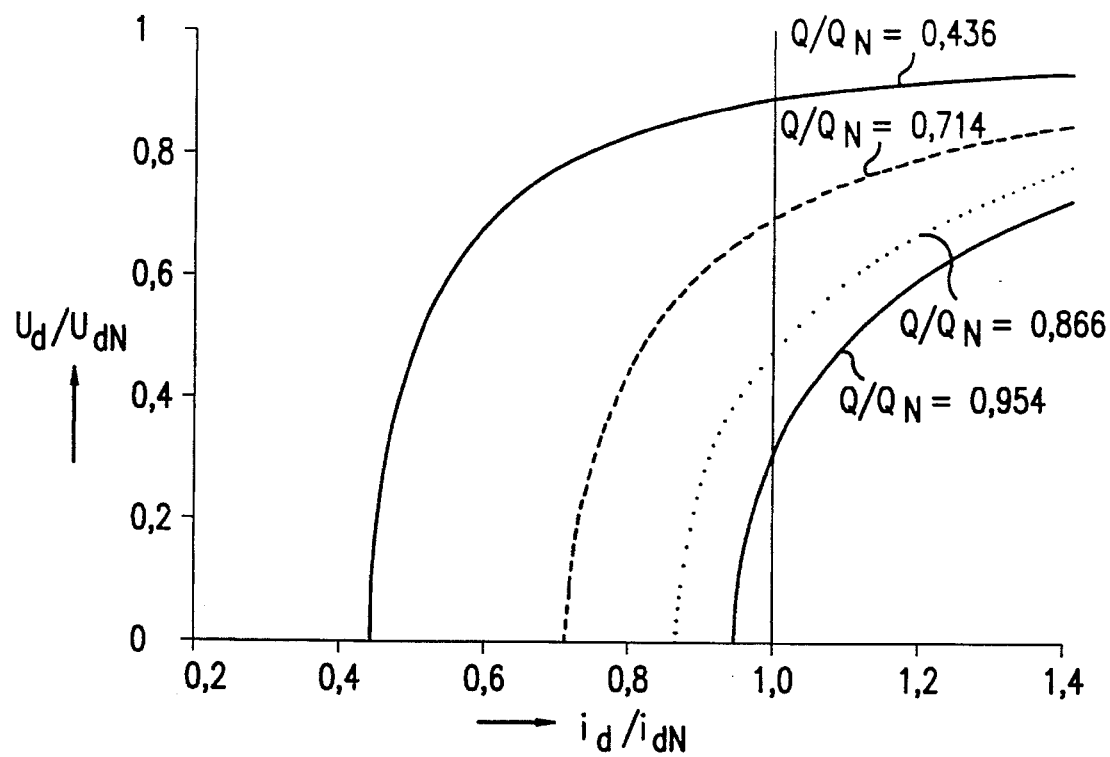
FIG. 4 shows rectifier characteristics for constant reactive powers.

FIG. 4 shows 4 rectifier characteristics for constant reactive power (Q), the ratio of the arc voltage ($U_d$) to the required DC voltage ($U_{dN}$) being shown on the ordinate and the ratio of the direct current ($i_d$) to the required current density ($i_{dN}$) being shown on the abscissor. On these curves it can be seen that, in the event of a load voltage change, it is possible to change to an operating point having the same reactive power consumption. Furthermore, it can be seen that the direct current ($i_d$) can be reduced in the event of a voltage drop, and, in contrast, must be increased in the event of a voltage rise, in order to keep the reactive power consumption constant. Overcontrol in comparison with constant current regulation must take place.

The mean value of the direct current ($i_d$) must correspond to the rated current of the rectifiers (5, 5') in order to ensure the required melt power. In order to avoid overdimensioning of the semiconductors, the current regulation time should be matched to the thermal semiconductor time constant (in the range of seconds).

Figure 5:
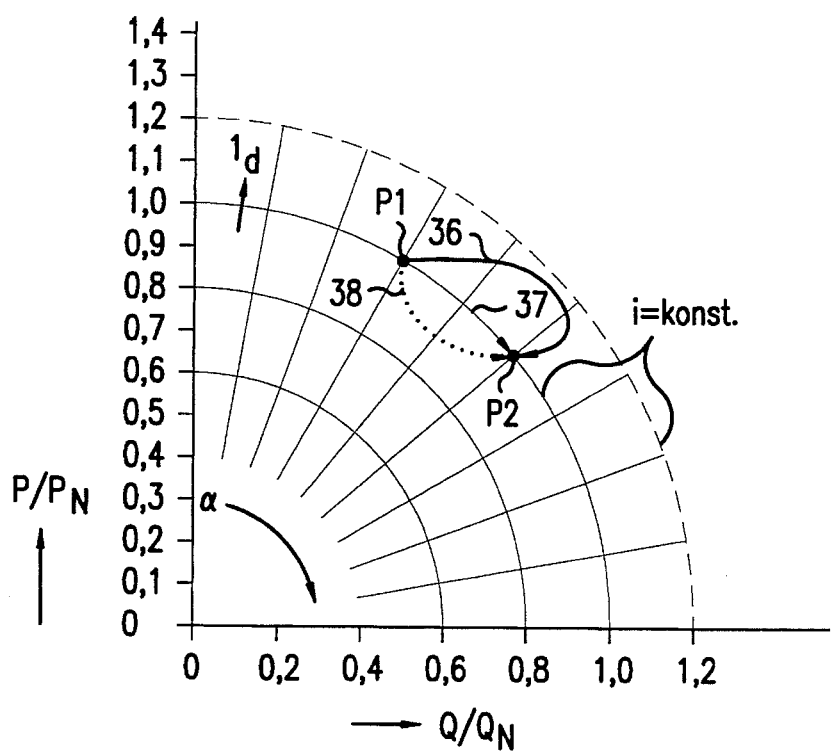
FIG. 5 shows a power/reactive power diagram of a rectifier.

FIG. 5 shows a power/reactive power diagram of a rectifier, in the case of which diagram the ratio of the power (P) to the rated power ($P_N$) is shown on the ordinate and the ratio of the reactive power (Q) to the rated reactive power ($Q_N$) is shown on the abscissor. Arrows point in the direction of increasing direct-current density ($i_d$) and triggering angle (α). The lines, which are in the form of circular arcs, apply to a constant current. If, in this diagram, one moves from a point (P1) to a point (P2) which differs therefrom but has the same direct-current density ($i_d$), then, in the case of pure current regulation, this is done in accordance with a regulation curve (36), in the case of additional voltage connection in accordance with a regulation curve (37), and in the case of the further additional connection of the control variable ($\Delta i_Q$) of the reactive power control loop, according to the invention, in accordance with a regulation curve (38). It can be seen that, of the 3 regulation curves (36, 37, 38), the regulation curve (38) requires the least reactive power (Q) for the transfer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by latest patent of the United States is:

1. A regulation method for a DC arc furnace, comprising the steps of:
   a) controlling arc current density as a function of a required current density and
   b) as a function of an arc voltage; and
   c) regulating said arc current density by supplying a control variable $\Delta i_Q$ based on reactive power of the DC arc furnace to a triggering angle limiter for at least one rectifier, where:

$$\Delta i_Q = k_q \cdot i_{dN} \cdot \{<(1-U_f^2)/(1-U_{ist}^2/U_{dN}^2)>^{0.5}-1\}$$

and where: $k_q$=a factor which can be predetermined, $i_{dN}$=the required current density of the arc furnace, $U_f=1/(1+p \cdot T_Q)$, p=complex frequency, $T_Q$=reactive power time constant, $U_{ist}$=a filtered arc voltage, and $U_{dN}$=a required DC voltage of the arc furnace.

2. The regulation method as claimed in claim 1, wherein a lower-level current control loop keeps a mean value of the arc current density substantially constant within a time period of 0.5 s–1 s.

3. The regulation method as claimed in claim 1, wherein said step of regulating further includes a step of:
   minimizing reactive power fluctuations within 250 ms.

4. The regulation method as claimed in claim 1, wherein said step of regulating further includes a step of;
   minimizing reactive power fluctuations within 180 ms.

5. The regulation method as claimed in claim 1, wherein the reactive power time constant is in a time range of 60 ms$\leq T_Q \leq$250 ms.

6. The regulation method as claimed in claim 1, wherein the reactive power time constant is in a time range of 10 ms$\leq T_Q \leq$180 ms.

7. A regulation method for a DC arc furnace, comprising the steps of:
   a) controlling arc current density as a function of a required current density and
   b) as a function of an arc voltage; and
   c) regulating said arc current density by supplying a control variable $\Delta i_Q$ based on reactive power of the DC arc furnace as said required current density, where:

$$\Delta i_Q = k_q \cdot i_{dN} \cdot \{<(1-U_f^2)/(1-U_{ist}^2/U_{dN}^2)>^{0.5}-1\}$$

and where: $k_q$=a factor which can be predetermined, $i_{dN}$=the required current density of the arc furnace, $U_f=1/(1+p \cdot T_Q)$, p=complex frequency, $T_Q$=reactive power time constant, $U_{ist}$=a filtered arc voltage, and $U_{dN}$=a required DC voltage of the arc furnace.

8. The regulation method as claimed in claim 7, wherein a lower-level current control loop keeps a mean value of the arc current density substantially constant within a time period of 0.5 s–1 s.

9. The regulation method as claimed in claim 7, wherein said step of regulating further includes a step of:
   minimizing reactive power fluctuations within 250 ms.

10. The regulation method as claimed in claim 7, wherein said step of regulating further includes a step of:
    minimizing reactive power fluctuations within 180 ms.

11. The regulation method as claimed in claim 7, wherein the reactive power time constant is in a time range of 60 ms$\leq T_Q \leq$250 ms.

12. The regulation method as claimed in claim 7, wherein the reactive power time constant is in a time range of 10 ms$\leq T_Q \leq$180 ms.

* * * * *